UNITED STATES PATENT OFFICE

WILLIAM W. HUBBELL, OF PHILADELPHIA, PENNSYLVANIA.

IMPROVEMENT IN DESULPHURIZING ORES AND EXTRACTING GOLD AND SILVER.

Specification forming part of Letters Patent No. 65,387, dated June 4, 1867; reissue No. 5,957, dated July 7, 1874; application filed June 29, 1874.

*To all whom it may concern:*

Be it known that I, WILLIAM WHEELER HUBBELL, of the city of Philadelphia and State of Pennsylvania, have invented a new and useful Improvement in the Process of Desulphurizing and Extracting Gold and Silver from Ores; and I hereby declare the following to be a full, clear, and exact description thereof.

The nature of my invention or process consists in first pulverizing the ore, and then saturating it with a solution of saltpeter or niter, and uniting it with charcoal or carbon as fuel, rendering it combustible, and then burning and desiccating it by the application of fire, which consumes the sulphur, saltpeter, and charcoal together, and leaves the ore both desulphurized and desiccated; and it is then washed with water to float earth and ashes, and the residuum is amalgamated with quicksilver, which unites with the gold and silver, forming an amalgam from which the gold and silver, or either, are extracted in the usual manner; or the residuum may be fused in a retort to separate the metal; or the gold freed by the desiccation may be washed out.

Pulverize the gold and silver ore very fine by passing it through Hubbell & Patton's reducing machinery, or by any other process that will reduce it about as fine as wheat flour. It may be first roasted in bulk, if fuel is convenient. Then take saltpeter or niter and dissolve it in water—twenty gallons of water and twenty pounds of saltpeter—and add twenty pounds of finely-pulverized charcoal. When thoroughly dissolved and mixed or saturated with the water, pour this onto one ton, short weight—that is, two thousand pounds of the pulverized ore—in a tight-bottom wood mixing-vat, and stir it well together with a hoe; then spread it out on another or drying-vat in the sun, where let it thoroughly dry. By this process the sulphur in the ore will have united with the saltpeter, and in the presence of the charcoal will have become very combustible, and thus converted into a fuel for releasing itself from the ore, and desiccating the ore on the application of fire. Then throw the ore thus prepared by the shovelful onto an oven-bed of fire-brick, made flat, and heated to a red heat, having an opening on one side, through which to punch the desiccated ore off into a vat of water underneath a chute extending from the opening of the bed. A funnel, chimney, or flue must be suspended over the oven-bed to conduct off the gases, from which they may be condensed and saved. The ore thus prepared on this fire-bed will burn and become both desulphurized and desiccated, and the gold and silver be partially set free. Push the burnt ore off into the water in the vat below the chute, and also feed on more ore to the oven-bed or fire as the desiccation proceeds. Stir up the desiccated ore in the water-vat and the ashes and light earthy matter will float off, with a continous stream of water running in and out of the vat. Shovel out the residuum from the bottom of the vat, and put it in Hubbell's amalgamating-machine, or in any other amalgamating apparatus, and amalgamate it with quicksilver. The quicksilver, with the ore thus desulphurized and desiccated, will readily unite with the gold or silver, after which done, it can be extracted by the usual process, leaving the gold or silver for bullion. The desiccated ore or residuum may be washed in any apparatus for the purpose, and thus the freed gold washed out instead of amalgamated. The silver ore is best to be amalgamated. In case a furnace is employed to smelt the ore, the ore first pulverized and saturated with the saltpeter alone, or with the powdered charcoal included, may be thrown into a charcoal fire in the furnace, and thus desiccated and set free, or smelted with any suitable flux. The quantity of saltpeter, of course, may be varied with the amount of sulphur in the ore, which, from the nature of the case, can only be ascertained by experiment with each particular ore.

The proportions of gunpowder, that is, seventy-five parts of saltpeter, fifteen of charcoal, and ten of sulphur, produce the most perfect combustion of the sulphur quickly; but the proportions I have first given are more economical for general mining purposes, hold the fire longer, and, though slower, produce a more complete desiccation of the ore. The proportions may be more or less varied with the ore. If the sulphur is not consumed add more saltpeter and charcoal.

I do not mean to confine myself to any particular proportions or quantity of saltpeter or charcoal to the ton of ore. Nor do I mean to confine myself to the form of carbon employed. Charcoal or carbon as fuel in other form—that is, wood-shavings, sawdust, fine chips of wood, ground bark of trees, dried leaves of trees, dried grass, grain chaff, and similar carbon fuel in any form—convenient in the vicinity of the mines, is mixed with the pulverized ore by saturating them together with water, and drying the composition to prepare the ore for combustion to desulphurize it.

The main feature of my invention consists in saturating the pulverized ore with water, mixed up thoroughly with elements of fuel, and next drying the composition, whereby it cracks with fissures, and into lumps, when shoveled or placed on the red-hot oven-bed, and the combustion of the fuel within it renders it combustible on this heated oven or fire bed. The carbon-fuel burns, making the composition porous or open, and free for the passage of the flame and gases, as the sulphur burns out of the ore, a property and operation which the dry pulverized ore, in a powder alone, does not possess nor admit of.

I do not confine myself to the use of all the elements together, as the process is divisible. The niter, to give additional oxygen may be omitted, and the air alone relied on; and the carbon may be omitted, though all together give the best results.

So long as the saturating of the ore mixed with carbon in any form or niter as fuel, and drying to prepare the composition, rendering it combustible with fire in this manner, on an open oven-bed with fire underneath, is maintained, the ore will be burned or desulphurized, and most rapidly when both the carbon and niter are used.

What I claim as my invention is—

1. The process of desulphurizing ore, consisting of saturating the pulverized gold or silver ore with water and uniting it with saltpeter and charcoal, or carbon in other form, next drying the composition, rendering it combustible, and applying fire upon and by means of a heated oven or fire bed, substantially as described.

2. The process of desulphurizing ore, consisting of mixing the pulverized gold or silver ore with charcoal, or carbon as fuel in other form, and with water in a separate vat, next drying the composition, rendering it combustible, and next burning it by the application of fire on a heated oven-bed, substantially as described.

3. The process of desulphurizing ore, consisting of saturating the pulverized gold or silver ore with water and dissolved saltpeter, next drying the composition, thereby rendering it open and combustible, and next burning it on a furnace or heated oven-bed, substantially as described.

4. The process of desulphurizing the ore, consisting of mixing the pulverized ore of the precious metals, with any form of carbon-fuel, by saturating them with water, next drying the composition, rendering it combustible, and burning it with fire on a heated oven or fire bed, substantially as described.

5. The process of desulphurizing ores, and extracting the gold or silver, consisting of mixing the pulverized ore with water, and any carbon in any form as fuel, next drying the composition, rendering it combustible, and burning it by applying fire by means of an oven or fire bed, next washing and amalgamating or fusing the residuum, substantially as described.

WM. WHEELER HUBBELL.

Witnesses:
THOMAS C. CONNOLLY,
HARRY COLEMAN.